United States Patent
Momiyama

(10) Patent No.: US 10,709,063 B2
(45) Date of Patent: Jul. 14, 2020

(54) BATTERY-POWERED WORKING MACHINE

(71) Applicant: YAMABIKO CORPORATION, Tokyo (JP)

(72) Inventor: Hiroshi Momiyama, Hiroshima (JP)

(73) Assignee: YAMABIKO CORPORATION, Tokyo (JP)

( * ) Notice: Subject to any disclaimer, the term of this patent is extended or adjusted under 35 U.S.C. 154(b) by 359 days.

(21) Appl. No.: 15/324,704

(22) PCT Filed: Aug. 20, 2014

(86) PCT No.: PCT/JP2014/004263
§ 371 (c)(1),
(2) Date: Jan. 7, 2017

(87) PCT Pub. No.: WO2016/013050
PCT Pub. Date: Jan. 28, 2016

(65) Prior Publication Data
US 2017/0202137 A1    Jul. 20, 2017

(30) Foreign Application Priority Data

Jul. 23, 2014 (JP) ................... 2014-149730

(51) Int. Cl.
*A01D 34/416* (2006.01)
*B25F 5/02* (2006.01)
*A01D 34/68* (2006.01)
*B25F 5/00* (2006.01)

(52) U.S. Cl.
CPC ......... *A01D 34/4167* (2013.01); *A01D 34/68* (2013.01); *B25F 5/00* (2013.01); *B25F 5/02* (2013.01)

(58) Field of Classification Search
CPC .... A01D 34/4167; A01D 34/68; A01D 34/81; B25F 5/00; B25F 5/02
USPC .......................................... 173/213, 170, 171
See application file for complete search history.

(56) References Cited

U.S. PATENT DOCUMENTS

| 6,257,351 | B1 * | 7/2001 | Ark | A61B 17/1626 |
| | | | | 173/178 |
| 6,257,542 | B1 * | 7/2001 | Westfield | E05B 73/0082 |
| | | | | 248/551 |
| 7,455,544 | B2 * | 11/2008 | Glauning | B25F 5/02 |
| | | | | 439/352 |
| 8,984,711 | B2 * | 3/2015 | Ota | H01M 2/10 |
| | | | | 15/339 |
| 9,630,310 | B2 * | 4/2017 | Ito | H02J 7/00 |
| 2010/0193209 | A1 * | 8/2010 | Schadow | B24B 23/04 |
| | | | | 173/162.2 |

(Continued)

FOREIGN PATENT DOCUMENTS

| JP | 2002-362456 A | 12/2002 |
| JP | 3138654 U | 1/2008 |

(Continued)

*Primary Examiner* — Hemant Desai
*Assistant Examiner* — Veronica Martin
(74) *Attorney, Agent, or Firm* — Maschoff Brennan

(57) ABSTRACT

Provided is a battery-powered working machine including a protective bracket which is able to be secured to a casing while being in engagement with a battery pack, which is capable of preventing theft of the battery pack, and which separates a casing-side connection terminal from a battery-side connection terminal at a distance to keep the casing-side and battery-side connection terminals and out of contact with each other.

4 Claims, 15 Drawing Sheets

(56) References Cited

U.S. PATENT DOCUMENTS

| | | | | |
|---|---|---|---|---|
| 2010/0218967 A1* | 9/2010 | Ro kamp | A01G 3/053 | 173/217 |
| 2010/0258327 A1* | 10/2010 | Esenwein | H01R 39/381 | 173/217 |
| 2011/0022032 A1* | 1/2011 | Zemlok | A61B 17/07207 | 606/1 |
| 2011/0056717 A1* | 3/2011 | Herisse | B25F 5/02 | 173/217 |
| 2011/0179757 A1* | 7/2011 | Scott-Stanbridge | A01D 34/695 | 56/12.8 |
| 2011/0198103 A1* | 8/2011 | Suzuki | B25F 5/00 | 173/46 |
| 2011/0284257 A1* | 11/2011 | Ogino | B25F 5/00 | 173/217 |
| 2012/0317821 A1* | 12/2012 | Tsuchiya | B25F 5/02 | 30/196 |
| 2013/0091905 A1* | 4/2013 | Brown | E05B 73/0017 | 70/15 |
| 2013/0141217 A1* | 6/2013 | Goren | G08B 21/0288 | 340/10.1 |
| 2013/0164587 A1* | 6/2013 | Smith | H01M 2/1061 | 429/97 |
| 2014/0352994 A1* | 12/2014 | Yoshikane | B25D 17/04 | 173/162.2 |
| 2015/0165614 A1* | 6/2015 | Frenken | B23Q 17/007 | 173/2 |
| 2015/0366133 A1* | 12/2015 | Nojiri | A01D 34/90 | 30/276 |
| 2015/0367497 A1* | 12/2015 | Ito | B25F 5/02 | 173/217 |
| 2017/0202137 A1* | 7/2017 | Momiyama | A01D 34/68 | |
| 2019/0103597 A1* | 4/2019 | Hennesy | H01M 2/341 | |

FOREIGN PATENT DOCUMENTS

| | | |
|---|---|---|
| JP | 2009-40309 A | 2/2009 |
| JP | 2010-200673 A | 9/2010 |
| JP | 2011-97837 A | 5/2011 |
| JP | 5443208 B2 | 3/2014 |

\* cited by examiner

BATTERY-POWERED WORKING MACHINE

TECHNICAL FIELD

The present invention relates to a battery-powered working machine including an electric motor powered by a battery, and in particular, to a battery attachment portion of the battery-powered working machine.

BACKGROUND ART

Battery-powered working machines including an electric motor powered by a battery have been known from Patent Documents 1 and 2, for example. At hardware stores in North America, battery-powered working machines such as brush cutters, hedge trimmers, and chain saws are put on display in an unpacked state and with their battery packs attached thereto. A customer selects a machine thus displayed and carries it in a shopping cart to a checkout counter for purchasing it. In such a case, since the battery packs, which are expensive and can be detached easily, are exposed, there is a risk of theft of the battery packs. In addition, if a store clerk or a customer mistakenly turns a machine on, an actuated blade or the like may cause injuries.

To prevent the theft and injuries, hardware store clerks anchor each battery pack with a binding band or a wire, for example.

Meanwhile, a theft prevention clamp is known from Patent Document 3, for example. This clamp is used to prevent the theft of an article such as a computer placed, for example, on top of a table. One has to use a dedicated tool or implement to remove the article from the clamp without difficulty.

CITATION LIST

Patent Document

Patent Document 1: Japanese Unexamined Patent Publication No. 2010-200673
Patent Document 2: Japanese Patent No. 5342472
Patent Document 3: U.S. Pat. No. 6,257,542

SUMMARY OF THE INVENTION

Technical Problem

However, the theft prevention technique as described in Patent Document 3 requires, as an essential component, a support on which a product is anchored. Therefore, the technique is inapplicable to a product such as an electric tool, which a customer would like to hold in his/her hand to check its workability before purchasing it. Further, if a dedicated tool is necessary, a customer has to take the trouble to ask a store clerk to remove a desired product from the clamp, in order to put the product in a shopping cart.

In view of the foregoing background, it is therefore an object of the present invention to reliably prevent the theft of a battery pack of a battery-powered working machine put on display at a hardware store or any other place by adopting a simple structure, and to prevent unintentional actuation of the working machine.

Solution to the Problem

To achieve the object, a battery-powered working machine of the present invention includes a protective bracket provided between a battery pack and a casing.

Specifically, a battery-powered working machine of a first aspect of the present invention includes:

a casing which houses an electric motor;
a work unit which is driven by the electric motor and extends from the casing;
a battery pack which is attachable to and detachable from the casing, and capable of supplying power to the electric motor;
a casing-side connection terminal which is provided to the casing and connectable to a battery-side connection terminal provided to the battery pack; and
a protective bracket which is capable of being secured to the casing while being in engagement with the battery pack, which is capable of preventing theft of the battery pack, and which keeps the casing-side connection terminal and the battery-side connection terminal at a distance from each other to prevent contact between the casing-side and battery-side connection terminals.

With this configuration, the protective bracket being in engagement with the battery pack is secured to the casing, resulting in that the casing-side connection terminal and the battery-side connection terminal are kept at a distance from each other, and contact between the casing-side and the battery-side connection terminals may be prevented. Further, since the protective bracket being in engagement with the battery pack is secured to the casing, the theft of the battery pack may be prevented.

A second aspect of the present invention is an embodiment of the battery-powered working machine according to the first aspect. In the battery-powered working machine of the second aspect, the casing has a fastening portion via which the protective bracket is fastened.

Due to this configuration in which the protective bracket is fastened to the casing with a fastener, the battery pack is difficult to detach unless using a tool for removing the fastener, and it takes time to remove the fastener. This further enhances theft-prevention. Note that the fastener is not particularly limited to a screw or a pin, but it has to be a fastener which cannot be removed easily without using a tool or another appropriate implement. The fastening portion may be formed in a portion of, for example, a stand provided integrally with the casing.

A third aspect of the present invention is an embodiment of the battery-powered working machine according to the second aspect. In the battery-powered working machine of the third aspect, the protective bracket has an engagement portion which is engageable with a complementary engagement portion provided to the battery pack, and in a state where the engagement portion is in engagement with the complementary engagement portion and the battery pack is housed in the casing by having been slid, the protective bracket disables the battery pack from being drawn out.

With this configuration, the protective bracket, which has been inserted together with the battery pack inward, may be easily and reliably secured to the casing.

A fourth aspect of the present invention is an embodiment of the battery-powered working machine according to any one of the first to third aspects. In the battery-powered working machine of the fourth aspect, the protective bracket has an impact-absorbing portion, and is capable of absorbing impact occurring when the battery-powered working machine is dropped on a ground surface.

With this configuration, even if the battery-powered working machine is dropped by accident and hits the ground with the heavy battery pack first, for example, the impact-absorbing portion of the protective bracket is supposed to absorb the impact. Consequently, this configuration may avoid damage to more expensive parts such as the stand, the casing, electrical components disposed inside the casing, and the battery pack.

A fifth aspect of the present invention is an embodiment of the battery-powered working machine according to the fourth aspect. In the battery-powered working machine of the fifth aspect, the impact-absorbing portion is comprised of a weak portion of the protective bracket.

With this configuration, when impact occurs due to dropping the battery-powered working machine or any other cause, the weak portion is supposed to deform or to be crushed, thereby lessening the impact and effectively preventing damage to the other parts.

Advantages of the Invention

As can be seen, the battery-powered working machine of the present invention includes the protective bracket which is capable of being secured to the casing while being in engagement with the battery pack in order to prevent the theft of the battery pack. The protective bracket also keeps the casing-side connection terminal and the battery-side connection terminal at a distance from each other to prevent contact between the casing-side and battery-side connection terminals. Thus, with this simple structure, the present invention may reliably prevent the theft of the battery pack when the working machine is on display at a hardware store or at another place, and may prevent unintentional activation of the working machine.

BRIEF DESCRIPTION OF THE DRAWINGS

FIG. 8A is a front view, FIG. 8B is a side view, and FIG. 8C is a bottom view.

FIG. 11A is a plan view, FIG. 11B is a side view, and FIG. 11C is a front view.

FIG. 13A is a plan view, FIG. 13B is a side view, and FIG. 13C is a front view.

FIG. 15A is a plan view, FIG. 15B is a side view, and FIG. 15C is a front view.

DESCRIPTION OF EMBODIMENTS

An embodiment of the present invention will be described below with reference to the drawings.

Figure 2:
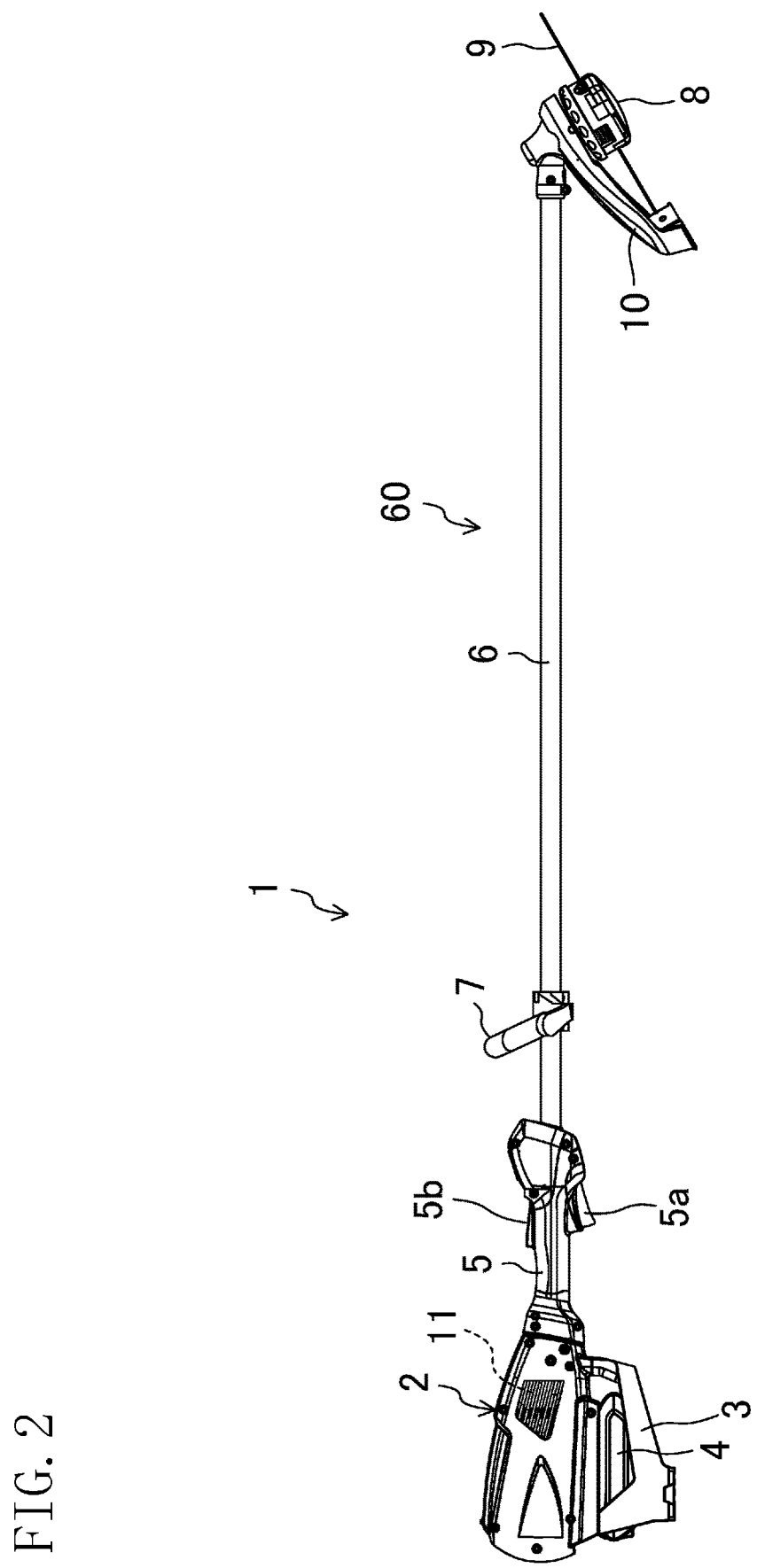
FIG. 2 is a side view of the battery-powered brush cutter.
Figure 3:
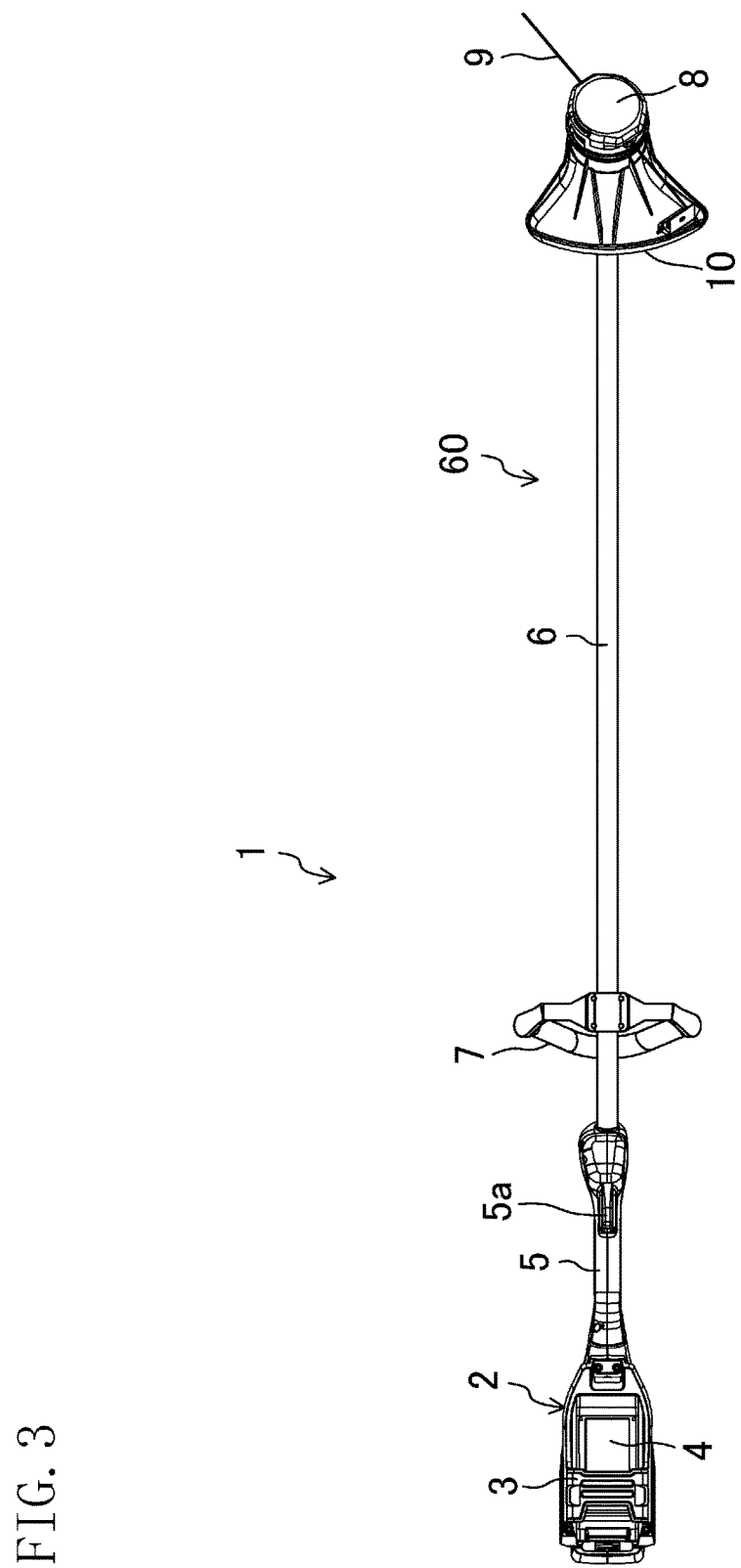
FIG. 3 is a bottom view of the battery-powered brush cutter.
Figure 4:
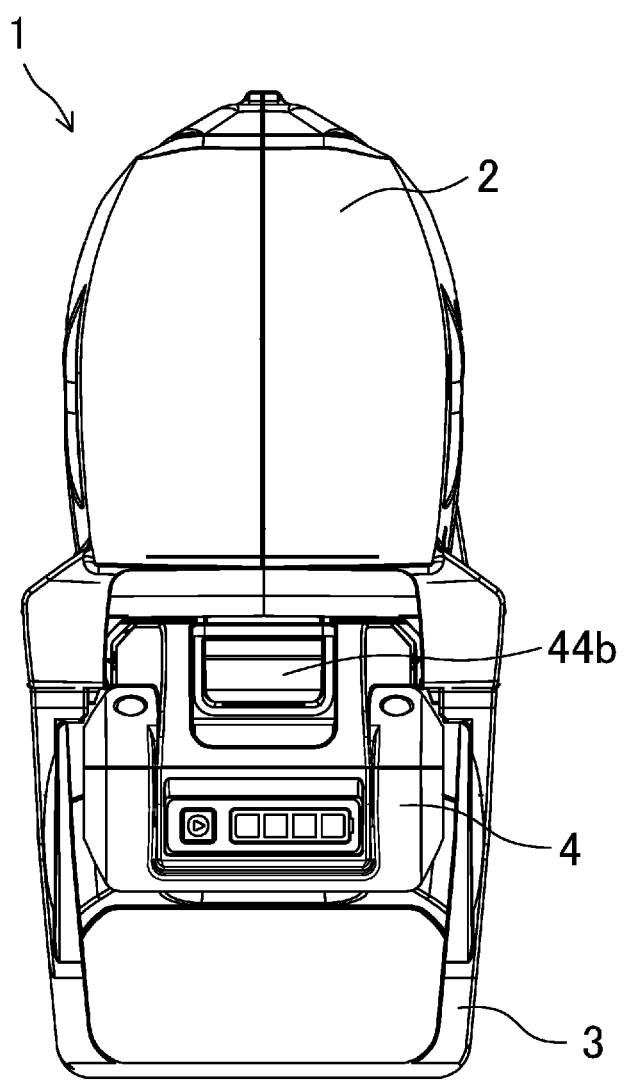
FIG. 4 is a rear view showing the rearward portion of the battery-powered brush cutter on an enlarged scale.

FIGS. 2-4 show a battery-powered working machine according to an embodiment of the present invention, which is configured as a battery-powered brush cutter 1. This battery-powered brush cutter 1 includes a casing 2 housing an electric motor 11. The casing 2 has a stand 3 coupled to a lower portion of the casing 2. The stand 3 may be integral with the casing 2. A battery pack 4 is slid, in a rear-to-front direction, into the stand 3 to be attached in a detachable manner. A rear handle 5 is provided to an end of the casing 2. A rod-shaped operation rod 6 extends from an end of the rear handle 5. A ring-shaped front handle 7 is coupled to a portion of the operation rod 6 which is near the rear handle 5. When a user presses an operation switch 5a provided on the lower surface of the rear handle 5, while holding down a safety switch 5b, the battery pack 4 supplies power to drive the electric motor 11.

A nylon cutter 8 is provided at a tip end of the operation rod 6. The nylon cutter 8 is able to rotate with drive power of the electric motor 11 and to cut weeds and other plants with turning force exerted by a nylon line 9 which extends from the nylon cutter 8. Note that a circular metal blade may be rotatably attached instead of the nylon cutter 8. The nylon cutter 8 has a side facing the casing 2 and covered with a debris shield 10 to prevent small stones or the like from scattering toward the user. A power transmitter (not shown) which is driven by the electric motor 11 and of which a main portion is disposed inside the operation rod 6, and the parts performing cutting work such as the nylon cutter 8 and the nylon line 9 together form a work unit 60.

For example, the casing 2 is made of a glass fiber reinforced plastic of nylon 6 (PA6) having a high strength, and the stand 3 is made of polypropylene resin.

Figure 5:
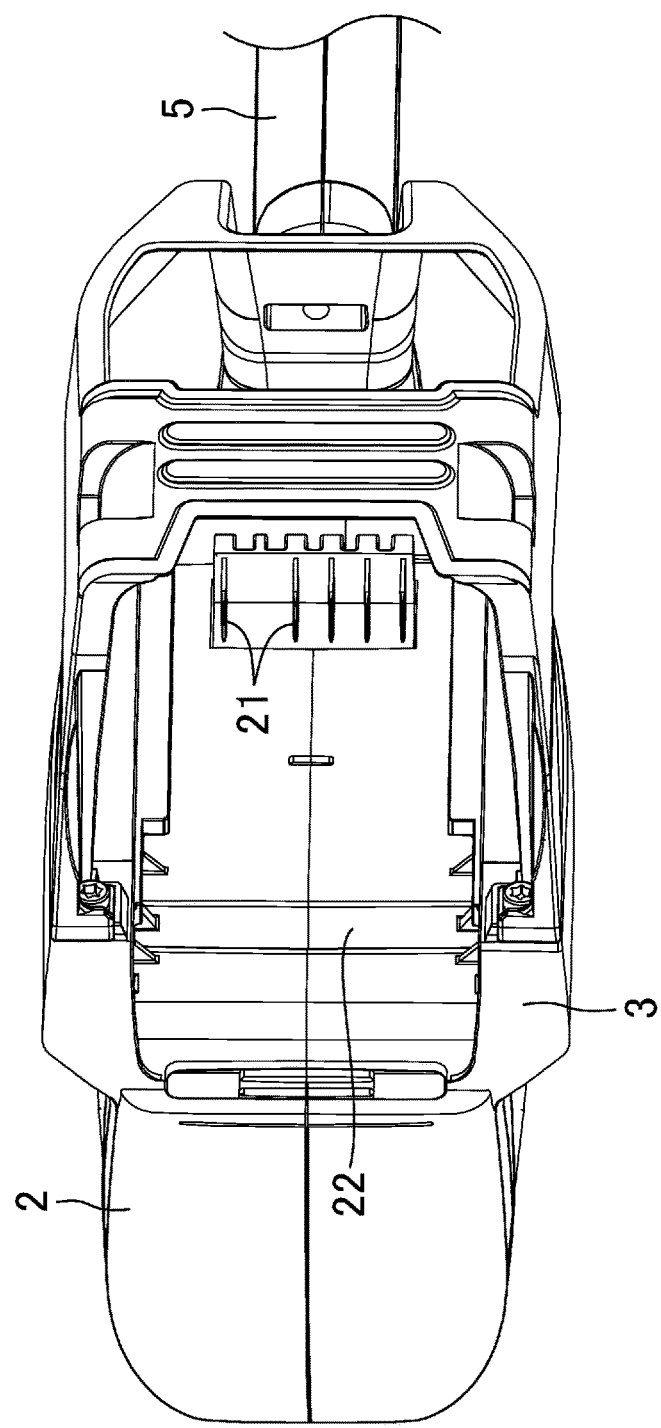
FIG. 5 is a bottom perspective view which shows, on an enlarged scale, casing-side connection terminals and its surroundings, without a battery attached thereto.

As shown in FIGS. 6-9, the battery pack 4 includes a battery cover 41 made of, for example, polycarbonate resin, and a plurality of batteries 42 housed in the battery cover 41. The battery cover 41 has, on a frontward portion of its upper surface, a plurality of battery-side connection terminals 43. On the other hand, as shown in FIG. 5, the casing 2 has, on its lower surface, a plurality of casing-side connection terminals 21. With this configuration, the battery pack 4 is slid in a rear-to-front direction to be inserted into the stand 3, thereby reliably connecting the battery-side connection terminals 43 to the casing-side connection terminals 21. The battery cover 41 has, on a rearward portion of its upper surface, a locking nail 44 made of, for example, nylon 6. The locking nail 44 is urged by a coil spring 44a and is capable of being depressed. The locking nail 44 is fitted in a locking recess 22 formed in a rearward portion of the lower surface of the casing 2 (see FIG. 6), thereby preventing the battery pack 4 from being detached. The locking nail 44 has a depression recess 44b formed in its rearward portion. When the user presses this depression recess 44b with his/her finger against the coil spring 44a, the battery pack 4 is unlocked from the locking recess 22 of the battery pack 4, and may be drawn out and removed.

The stand 3 provided to the casing 2 may be used to hold the battery-powered brush cutter 1 in a rest position, which enables the user to insert and draw out the battery pack 4 from the rear of the bush cutter 1.

The battery-powered brush cutter 1 further includes a protective bracket 50 which is capable of being secured to the stand 3 of the casing 2, while being in engagement with the battery pack 4. Specifically, this protective bracket 50 is made of, for example, a molding of a resin having suitable stiffness and flexibility, such as polypropylene resin. Note that the protective bracket 50 may be made of metal such as spring steel if the casing-side connection terminals 21 and the battery-side connection terminals 43 have a configuration different from that of this embodiment. The protective bracket 50 fulfils a function of preventing the theft of the battery pack 4, and a function of keeping the casing-side connection terminals 21 and the battery-side connection terminals 43 at a distance from each other to prevent contact between the casing-side and battery-side connection terminals 21 and 43.

Figure 9:
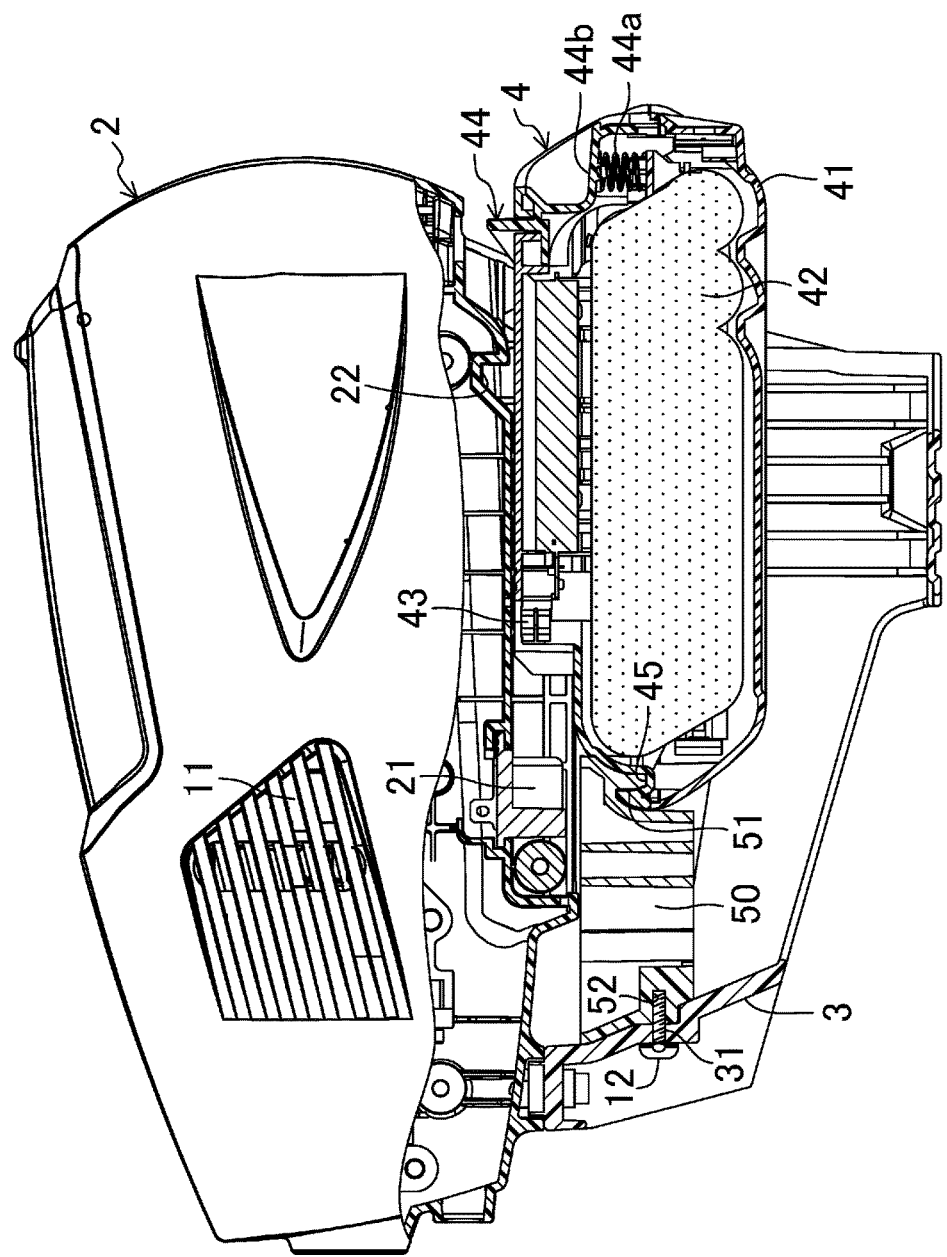
FIG. 9 is a partially-cutaway side view showing, on an enlarged scale, the rearward portion of the battery-powered brush cutter with a protective bracket attached thereto.
Figure 10:
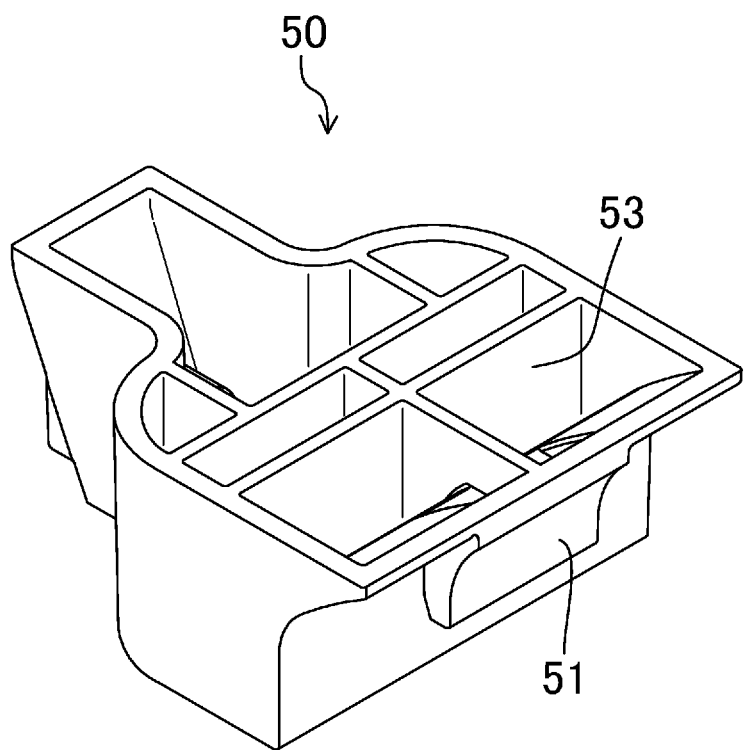
FIG. 10 is a perspective view showing the protective bracket on an enlarged scale.
Figure 11A:
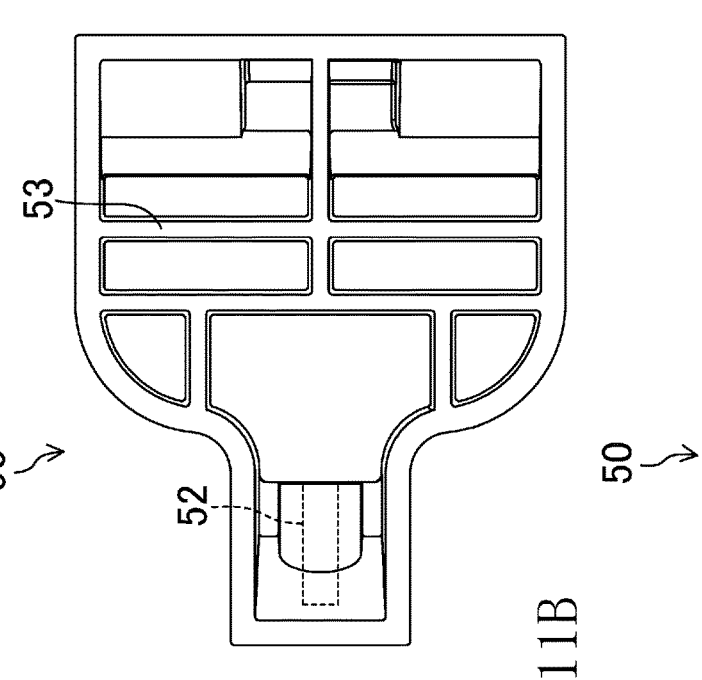
FIGS. 11A-11C show the protective bracket.
Figure 11B:
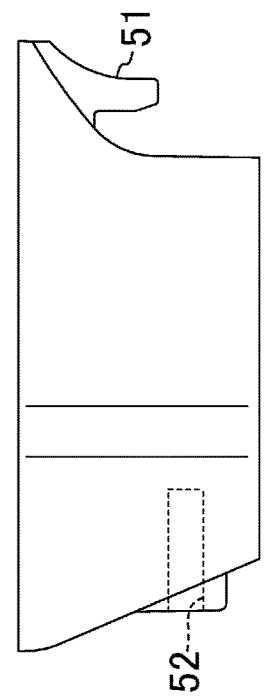
Figure 11C:
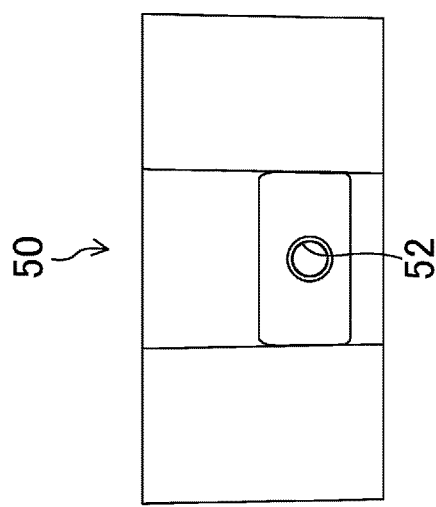

As shown in FIGS. 10 and 11, the protective bracket 50 has an engagement portion 51 which projects downward to be engaged with the battery pack 4. As can be seen in FIG. 9, this engagement portion 51 is engaged with a complementary engagement portion 45 provided to the battery pack 4, which allows the protective bracket 50 to engage with the battery pack 4. This engagement prevents the battery pack 4 from being detached even if the battery pack 4 is pulled in a direction opposite to the direction in which the battery pack 4 is inserted into the stand 3. As shown in the cutaway of FIG. 9, the stand 3 has, in its frontward portion, a through hole 31 functioning as a fastening portion via which the protective bracket 50 is fastened. Corresponding to the through hole 31, the protective bracket 50 has a screw hole 52 into which a screw 12 penetrating the through hole 31 is tightened (see FIG. 9 and FIG. 11C). The fastening portion is not particularly limited to the through hole 31, but may have any structure which allows the protective bracket 50 to be secured with a fastener such as the screw 12. As can be seen from the foregoing, the battery pack 4 being in engagement with the protective bracket 50 is slid to be housed in the stand 3, and while the battery pack 40 and the protective bracket 50 are inside the stand 3, the screw 12 is inserted into the through hole 31 and then tightened into the screw hole 52, thereby securing the protective bracket 50 to the stand 3. As a result, it is now impossible to draw the battery pack 4 out.

The protective bracket 50 includes an impact-absorbing portion 53 and is capable of absorbing impact on the battery pack 4 when the battery-powered brush cutter 1 is dropped on the ground. Specifically, the impact-absorbing portion 53 is comprised of a weak portion of the protective bracket 50. The protective bracket 50 of this embodiment includes a plurality of ribs and sidewalls. These ribs and sidewalls, of which strengths are set appropriately, form the weak portion. For example, part of the ribs or sidewalls may be reduced in thickness, or a notch may be formed in part of ribs.

Next, it will be described how to use the protective bracket 50 of this embodiment.

The protective bracket 50 of this embodiment is used in the case where the battery-powered brush cutter 1 is put on a display rack in an unpacked state, as in hardware stores in North America. The protective bracket 50 may be attached to the brush cutter 1 in the production line in advance, or after unpacking the battery-powered brush cutter 1 at a hardware store or other places. Attaching the protective bracket 50 in the production line may provide an advantage that the protective bracket 50 fulfils its functions also during transportation.

First, the battery-powered brush cutter 1 may be placed on the ground, or a table such that the user can see the stand 3 well.

Next, the battery pack 4, of which the complementary engagement portion 45 has been engaged with the engagement portion 51 of the protective bracket 50, is inserted into the stand 3, with the frontward end of the protective bracket 50 directed inward of the stand 3.

As shown in FIG. 9, in a state where the frontward end of the protective bracket 50 is held in contact with the surrounding portion of the through hole 31 of the stand 3, the screw 12 is tightened into the through hole 31 using, for example, a screwdriver.

Figure 1:
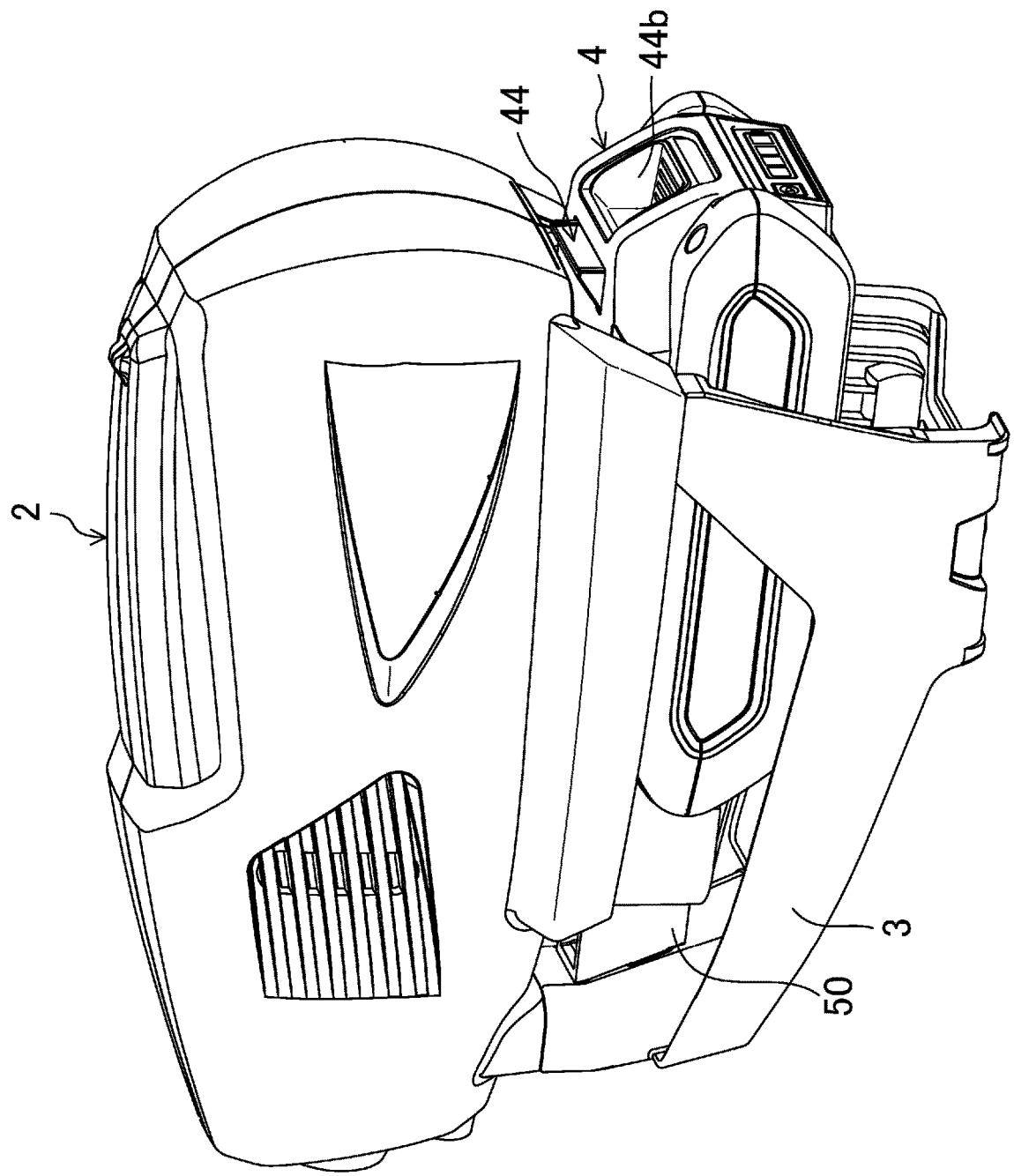
FIG. 1 is a perspective view showing, on an enlarged scale, a rearward portion of a battery-powered brush cutter according to an embodiment of the present invention.

Consequently, as shown in FIG. 1, the battery pack 4 is secured having its rearward portion projecting outward further than the rearward portion of the casing 2, and it may be ensured that the protective bracket 50 keeps the casing-side connection terminals 21 from the battery-side connection terminals 43 at a distance from each other, and prevents contact between the casing-side and battery-side connection terminal 21 and 43. Therefore, even if a clerk or a customer at a hardware store presses the operation switch 5a while holding down the safety switch 5b, the electric motor 11 is not actuated.

Figure 6:
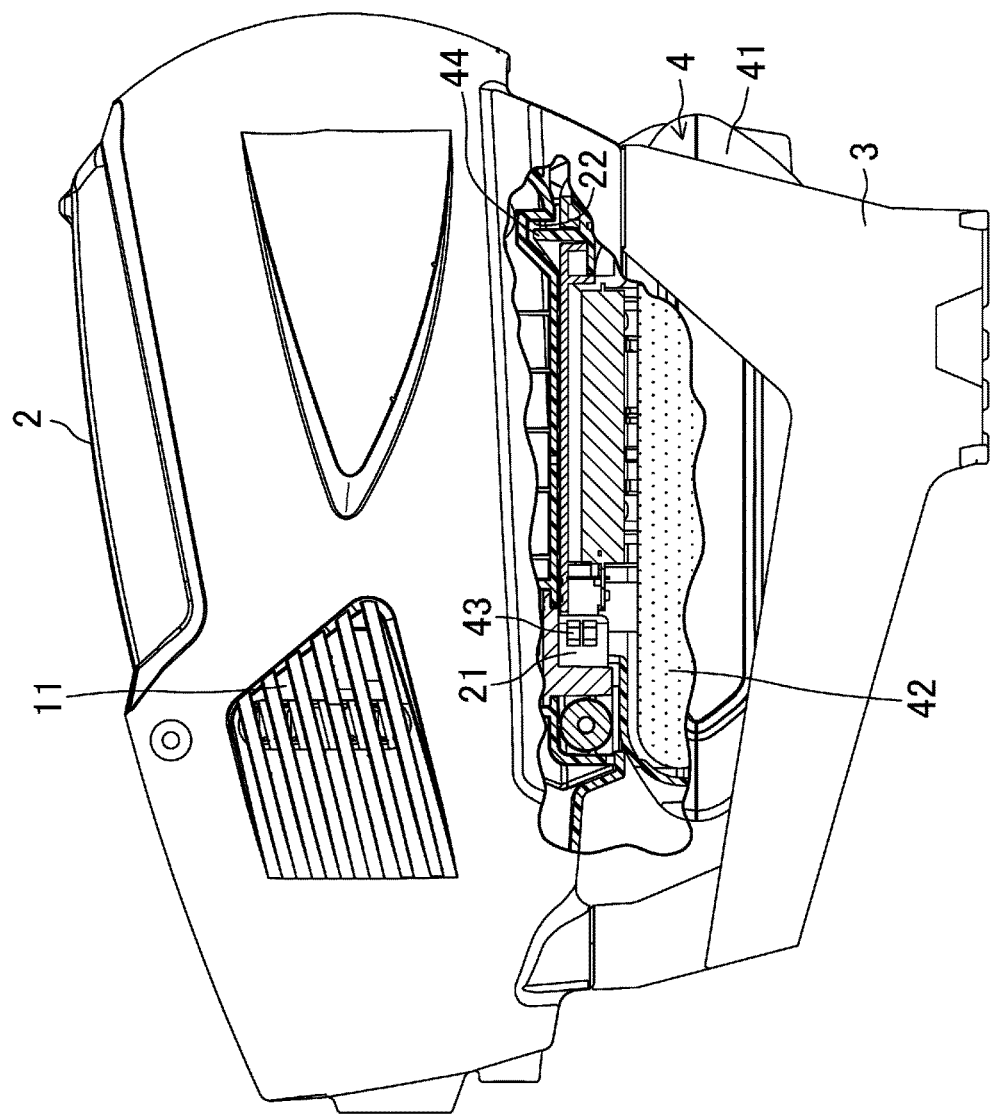
FIG. 6 is a partially-cutaway side view showing, on an enlarged scale, the rearward portion of the battery-powered brush cutter with a battery pack connected thereto.
Figure 7:
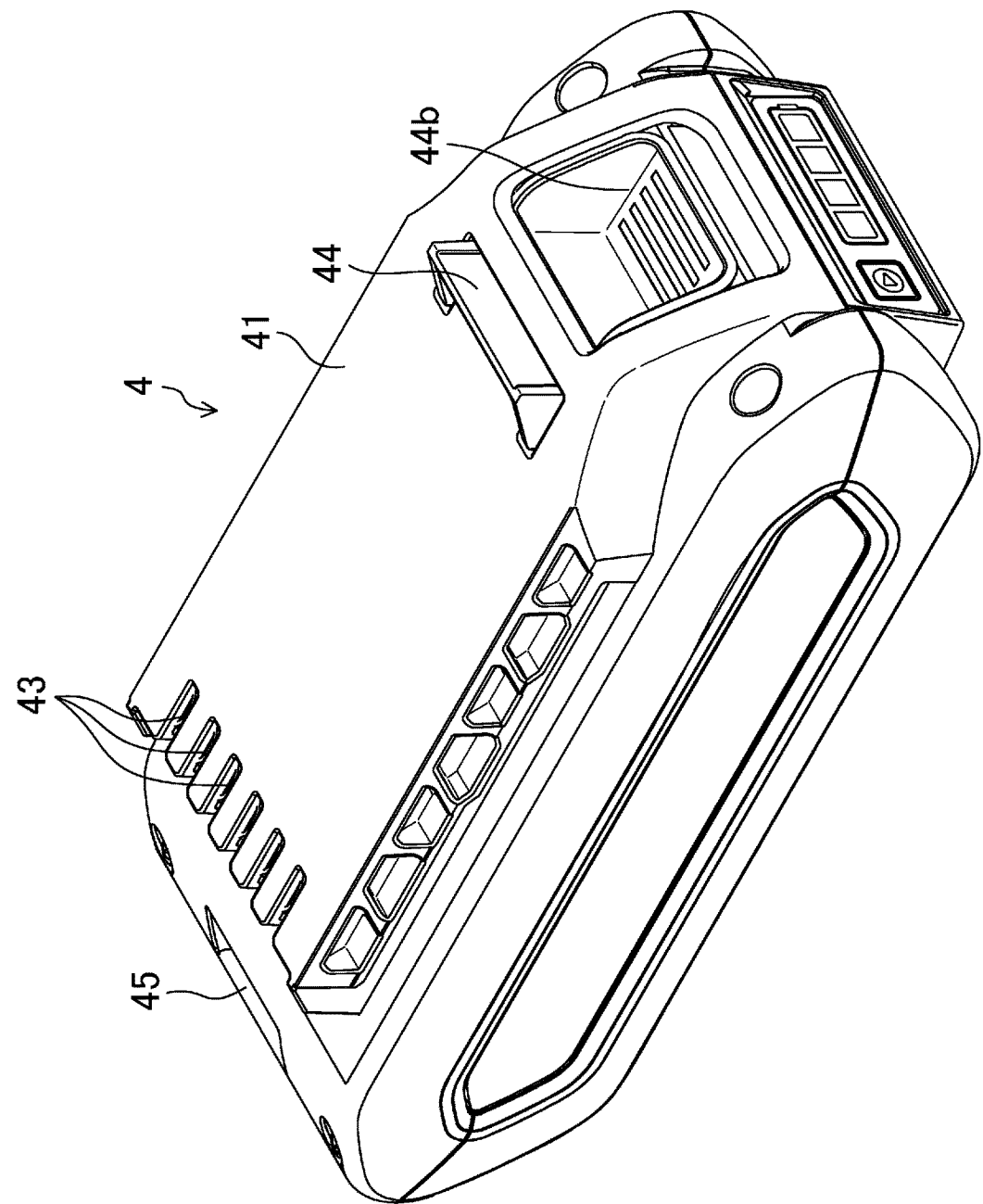
FIG. 7 is a perspective view showing a battery pack on enlarged scale.
Figure 8B:
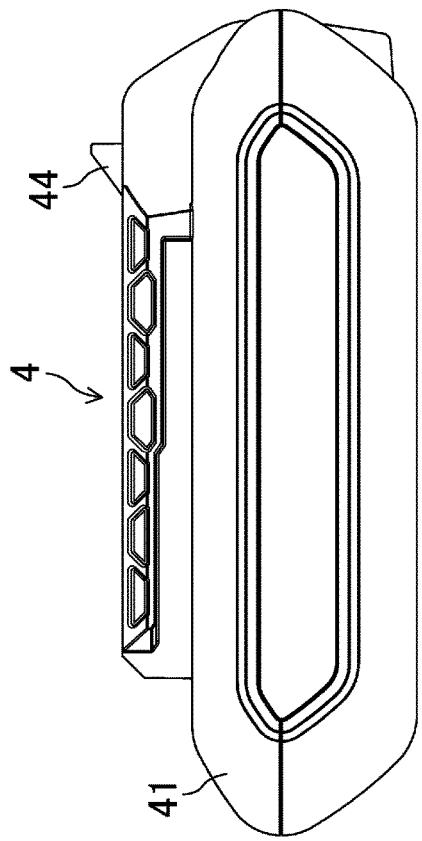
FIGS. 8A-8C show the battery pack, where
Figure 8C:
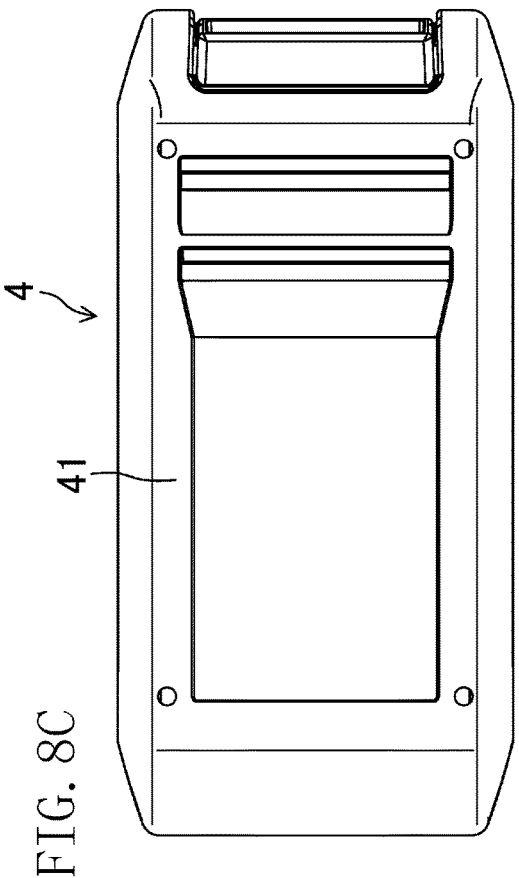
Figure 8A:
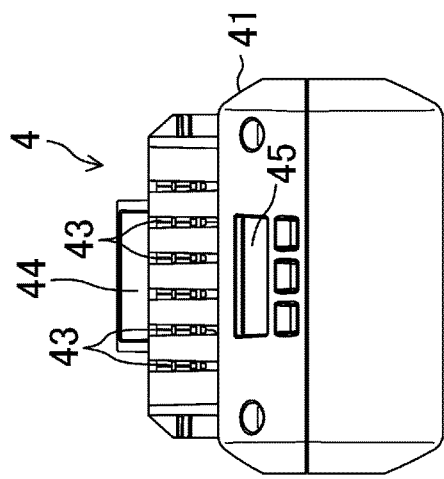

Further, the inserted battery pack 4 itself has not reached an innermost portion of the stand 3. Therefore, the battery pack 4 is secured not by fitting of the locking nail 44 in the locking recess 22 as shown in FIG. 6, but by being engaged with the protective bracket 50 and firmly secured to the stand 3 with the screw 12. It is therefore substantially impossible to detach the battery pack 4 without using a dedicated tool such as a screwdriver. In addition, it takes time to remove the screw 12 using a screwdriver. Thus, the configuration of this embodiment may reliably prevent the theft of the battery pack 4. If the screw 12 is configured as a special screw, which cannot be turned with screwdrivers for household use, the effect at preventing the theft will be further enhanced.

Further, according to this embodiment, the user can attach and detach the battery pack 4 to and from the battery-powered brush cutter 1 while the brush cutter 1 is held in the rest position by the stand 3. Consequently, the battery pack 4, which has been inserted inward together with the protective bracket 50, may be easily and reliably secured to the stand 3.

Furthermore, the protective bracket 50 of this embodiment has the impact-absorbing portion 53. Even if a hardware store clerk or a customer mistakenly drops the battery-powered brush cutter 1 and the battery pack 4 projecting rearward hits the ground, the weak portion of the protective bracket 50 is supposed to deform or to be crushed, which may prevent damage to the more expensive parts such as the stand 3, the casing 2, and the battery pack 4. If the impact-absorbing portion 53 is damaged, the inexpensive protective bracket 50 can be suitably replaced with a new protective bracket 50 by simply removing the screw 12. In general, the brush cutter 1 on display is hung at its debris shield 10, with the battery pack 4 facing the ground. It is therefore possible that a store clerk or a customer mistakenly drops the brush cutter 1 when putting it on display or reaching for it. The battery pack 4 is at a height of, for example, about 50 cm from the ground for easy viewing by customers. If the battery-powered brush cutter 1 is dropped from this height, the brush cutter 1 is subjected to an impact. However, the impact-absorbing portion 53 is supposed to be damaged, which reduces damage to the other parts.

Therefore, the simple structure of the battery-powered brush cutter 1 of this embodiment may reliably prevent the theft of the battery pack 4 not only when the brush cutter 1 is on display at a hardware store or other places, but also during storage for a long period in, for example, a shed of a user. Further, the configuration of this embodiment may also prevent unintentional actuation as well as damage to the battery-powered brush cutter 1 itself.

First Variation

Figure 12:
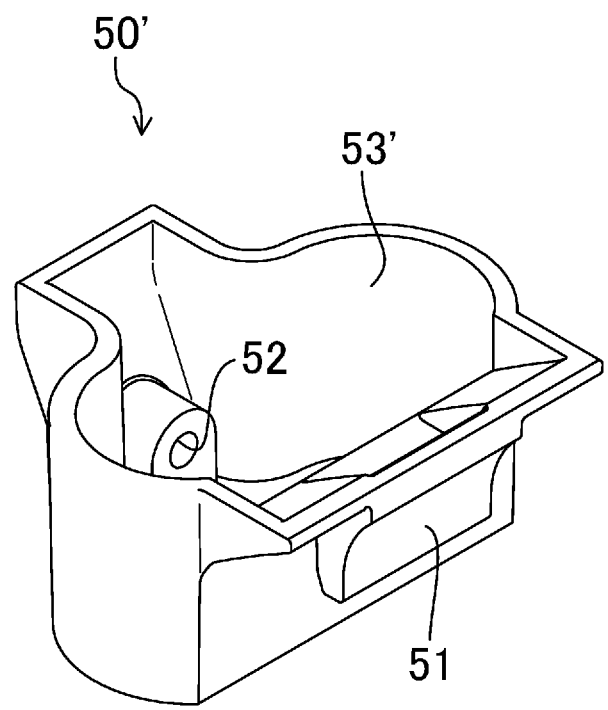
FIG. 12 is a perspective view showing, on an enlarged scale, a protective bracket according to a first variation.
Figure 13A:
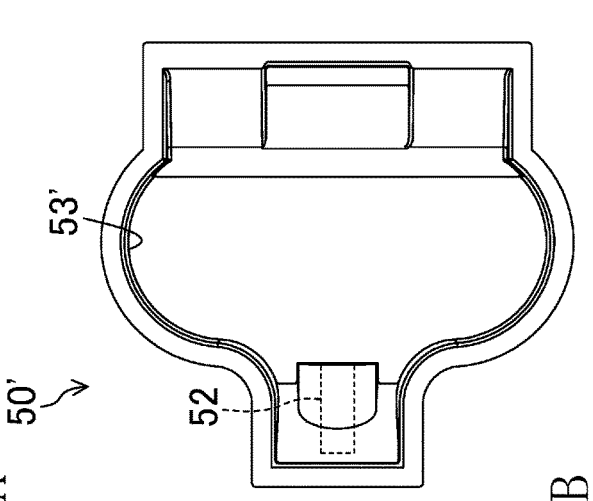
FIGS. 13A-13C show the protective bracket of the first variation, where
Figure 13B:
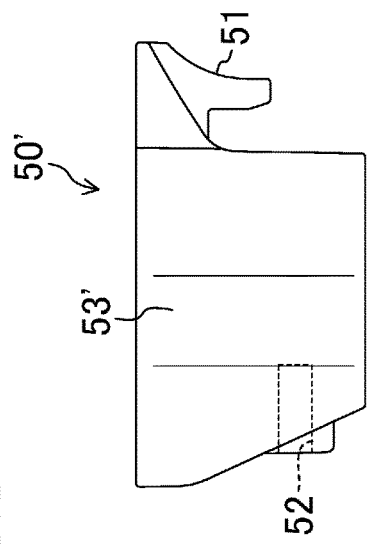
Figure 13C:
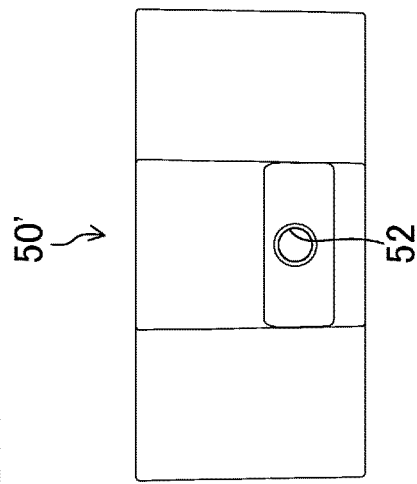

FIGS. 12 and 13 show a protective bracket 50' according to a first variation of the embodiment of the present invention. This protective bracket 50' includes a weak portion having a different shape from that of the embodiment described above. Note that in the following variations, components that are the same as those shown in FIGS. 1-11 will be denoted by the corresponding reference characters, and detailed description thereof will be omitted herein.

In this variation, the weak portion forming an impact-absorbing portion 53' is comprised of curved sidewalls and is devoid of the plurality of ribs provided in the embodiment described above. This structure makes the impact-absorbing portion 53' apt to be compressed in a direction away from the battery pack 4 when subjected to an impact, and further reduces the stiffness of the protective bracket 50'. As a result, the impact-absorbing portion 53' is supposed to deform when the brush cutter 1 hits the ground after having been dropped, thereby effectively preventing damage to the other parts.

Second Variation

Figure 14:
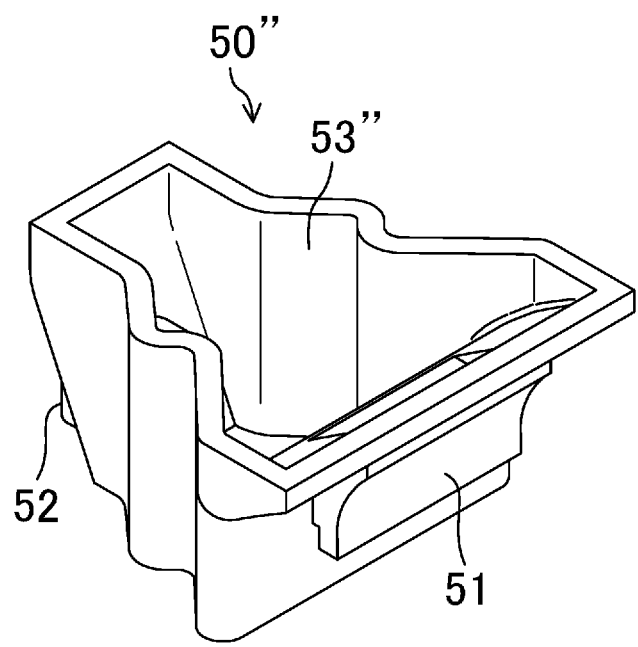
FIG. 14 is a perspective view showing, on an enlarged scale, a protective bracket according to a second variation.
Figure 15A:
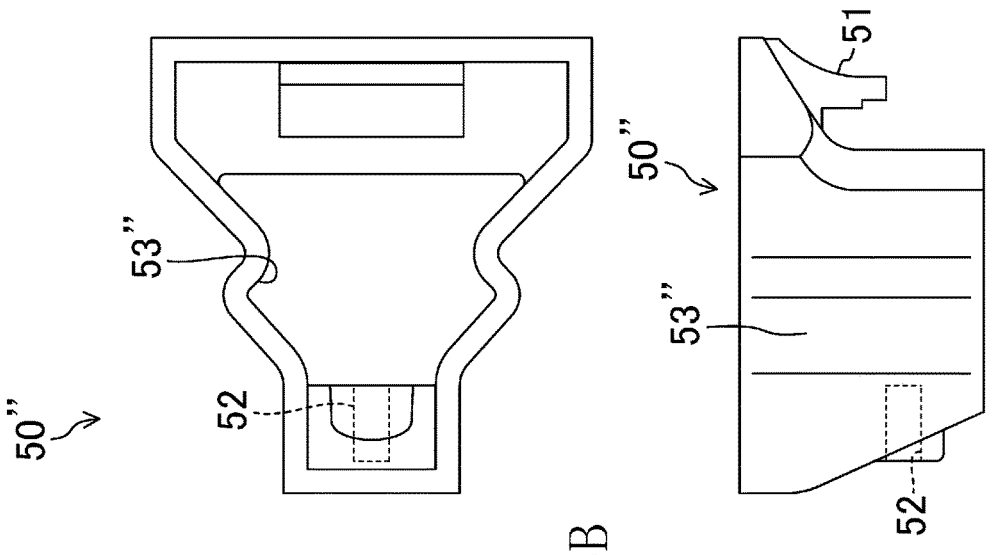
FIGS. 15A-15C show the protective bracket of the second variation, where
Figure 15B:
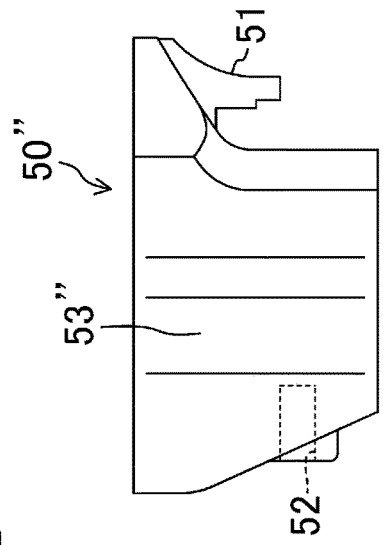
Figure 15C:
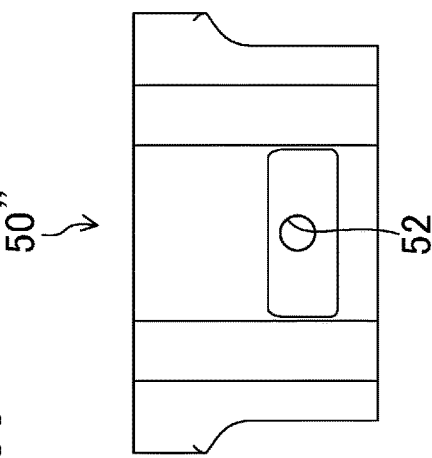

FIGS. 14 and 15 show a protective bracket 50" according to a second variation of the embodiment of the present invention. This protective bracket 50" includes a weak portion having a different shape from that of the embodiment described above.

A weak portion forming an impact-absorbing portion 53" of this variation is comprised of sidewalls curved in the form of a bellows. Also in this variation, the impact-absorbing portion 53" is more apt to be compressed in a direction away from the battery pack 4 when subjected to an impact than the impact-absorbing portion of the above embodiment having the plurality of ribs, and the stiffness of the impact-absorbing portion 53" is thus positively reduced. Thus, the protective bracket 50" having the reduced stiffness and the impact-absorbing portion 53" being supposed to deform may effectively prevent damage to the other parts.

(Other Embodiments)

The above-described embodiments of the present invention may be modified as follows.

Specifically, in the embodiments described above, the battery-powered working machine is configured as a battery-powered brush cutter 1 of which the work unit 60 performs the cutting work, as an example. The present invention is also applicable to other battery-powered working machines for various kinds of work, such as a hedge trimmer and a chain saw. In such a case, the work unit 60 may extend from any portion of the casing 2 and the insertion direction of the battery pack 4 is not limited to the direction described above. Further, the configuration is not limited to that of the above embodiment in which the battery pack 4 is inserted into the stand 3, but the battery pack 4 may be inserted into the casing 2 itself. In such a case, a through hole 32 is suitably formed in the casing 2. To enhance the effect of absorbing impact, it is beneficial that the rear end of the battery pack 4 is exposed in a state where the protective bracket 50 is attached.

Note that the embodiments described above are merely preferred examples in nature, and are not intended to limit the scope, application, or uses of the present invention.

INDUSTRIAL APPLICABILITY

As described above, the present invention is useful for battery-powered working machines such as brush cutters, hedge trimmers, chain saws, and other battery-powered machines.

DESCRIPTION OF REFERENCE CHARACTERS

1 Battery-powered Brush Cutter (Battery-powered Working Machine)
2 Casing
3 Stand
4 Battery Pack
5 Rear Handle
5a Operation Switch
5b Safety Switch
6 Operation Rod
7 Front Handle
8 Nylon Cutter
9 Nylon Line
10 Debris Shield
11 Electric Motor
12 Screw
21 Casing-side Connection Terminal
22 Locking Recess
31 Through Hole (Fastening Portion)
41 Battery Cover
42 Battery
43 Battery-side Connection Terminal
44 Locking Nail
44a Coil Spring
44b Depression Recess
45 Complementary Engagement Portion
50, 50', 50" Protective Bracket
51 Engagement Portion
52 Screw Hole
53, 53', 53" Impact-absorbing Portion
60 Work Unit

The invention claimed is:

1. A battery-powered working machine comprising:
a casing which houses an electric motor;
a work unit which is driven by the electric motor and extends from the casing;
a battery pack which is attachable to and detachable from the casing, the battery pack including a plurality of batteries and capable of supplying power to the electric motor, the plurality of batteries being housed in a battery cover of the battery pack;
a casing-side connection terminal which is provided to the casing and connectable to a battery-side connection terminal provided to the battery pack; and
a protective bracket that is separate from the battery pack and the battery cover of the battery pack, the protective bracket being configured to:
be removably coupled to the casing such that the protective bracket is configured to be completely detachable from the casing,
be slid with the battery pack into the casing,
be housed in the casing,
be secured to the casing while being in engagement with the battery cover, inhibit theft of the battery pack, and keep the casing-side connection terminal and the battery-side connection terminal at a distance from each other to prevent contact between the casing-side and battery-side connection terminals, wherein the casing has a fastening portion on a front side of the casing in a sliding direction of the battery pack, the fastening portion being configured to fasten the protective bracket between the casing and the battery cover by a screw.

2. The battery-powered working machine of claim 1, wherein the protective bracket has an engagement portion which is engageable with a complementary engagement portion of the battery pack, and in a state where the engagement portion is in engagement with the complementary engagement portion and the battery pack is housed in the casing by having been slid, the protective bracket disables the battery pack from being drawn out.

3. The battery-powered working machine of claim 1, wherein the protective bracket has an impact-absorbing portion, and is capable of absorbing impact occurring when the battery-powered working machine is dropped on a ground surface.

4. The battery-powered working machine of claim 3, wherein the impact-absorbing portion is configured to deform or be crushed in a direction away from the battery pack when the battery-powered working machine is dropped on the ground surface.

* * * * *